(12) United States Patent
Messerly et al.

(10) Patent No.: US 8,499,290 B2
(45) Date of Patent: Jul. 30, 2013

(54) CREATING TEXT FUNCTIONS FROM A SPREADSHEET

(75) Inventors: John Benjamin Messerly, Seattle, WA (US); James J. Hugunin, Mercer Island, WA (US); Jonathon Michael Stall, Bothell, WA (US); Curt Oliver Hagenlocher, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 12/815,801

(22) Filed: Jun. 15, 2010

(65) Prior Publication Data

US 2011/0307874 A1    Dec. 15, 2011

(51) Int. Cl.
G06F 9/45    (2006.01)
G06F 9/445   (2006.01)

(52) U.S. Cl.
USPC ............................ 717/140; 717/109; 717/141

(58) Field of Classification Search
USPC .................................. 717/109–115, 140–143
See application file for complete search history.

(56) References Cited

U.S. PATENT DOCUMENTS

| | | | | |
|---|---|---|---|---|
| 5,471,612 A | | 11/1995 | Schlafly | |
| 5,535,391 A | * | 7/1996 | Hejlsberg et al. | 717/140 |
| 5,581,760 A | * | 12/1996 | Atkinson et al. | 717/108 |
| 6,226,783 B1 | * | 5/2001 | Limondin et al. | 717/104 |
| 6,237,136 B1 | * | 5/2001 | Sadahiro | 717/110 |
| 6,311,327 B1 | * | 10/2001 | O'Brien et al. | 717/114 |
| 6,314,559 B1 | * | 11/2001 | Sollich | 717/111 |
| 6,526,566 B1 | * | 2/2003 | Austin | 717/109 |
| 6,766,512 B1 | | 7/2004 | Khosrowshahi et al. | |
| 7,117,435 B1 | | 10/2006 | Kotler | |
| 7,506,304 B2 | * | 3/2009 | Morrow et al. | 717/109 |
| 7,519,962 B2 | * | 4/2009 | Aman | 717/143 |
| 7,681,186 B2 | * | 3/2010 | Chang et al. | 717/143 |
| 7,712,085 B2 | * | 5/2010 | McCollum et al. | 717/130 |
| 7,761,858 B2 | * | 7/2010 | Chang et al. | 717/140 |
| 7,793,273 B2 | * | 9/2010 | Mercer et al. | 717/141 |
| 7,827,527 B1 | * | 11/2010 | Chiluvuri | 717/109 |
| 8,019,786 B2 | * | 9/2011 | Nevin, III | 707/797 |
| 8,046,737 B2 | * | 10/2011 | Wittenberg et al. | 717/109 |
| 8,296,744 B2 | * | 10/2012 | Langworthy et al. | 717/143 |
| 2004/0103366 A1 | | 5/2004 | Peyton-Jones et al. | |
| 2007/0006139 A1 | | 1/2007 | Rubin | |
| 2008/0244508 A1 | | 10/2008 | Mantuano | |
| 2009/0172063 A1 | | 7/2009 | Chirilov | |
| 2010/0083089 A1 | | 4/2010 | Rapp | |
| 2010/0095195 A1 | | 4/2010 | Coblenz | |

OTHER PUBLICATIONS

Abraham et al, "Auto test: A tool for automatic test case generation in spreadsheets", IEEE, pp. 43-50, 2006.*
Witkowski et al, "Spreadsheets in RDBMS for OLAP", ACM, pp. 52-63, 2003.*

(Continued)

*Primary Examiner* — Anil Khatri
(74) *Attorney, Agent, or Firm* — Workman Nydegger

(57) ABSTRACT

The present invention extends to methods, systems, and computer program products for creating text functions form a spreadsheet. Embodiments of the invention extract functions from spreadsheets and represent the functions in textual form. Representation in textual form promotes code reuse, clarify, expressive power, and better performance. Text can be rendered in virtually any programming language, such as, for example, C#, C++, Visual Basic ("VB"), etc. In some embodiments, programming language extensibility to support spreadsheet compatible data types and functions is utilized.

17 Claims, 3 Drawing Sheets

OTHER PUBLICATIONS

Sestoft, "Implementing function spreadsheets", ACM, pp. 91-94, 2008.*

Mittermeir et al, "Finding high level structures in spreadsheet programs", IEEE, pp. 1-12, 2002.*

Meadinkent.co.uk, "Exporting text files from Excel—sharing data with other programs", Aug. 2006, 3 pages.

Carmen, "Convert Formula to text", Aug. 3, 2007, 2 pages.

Pearson, Charles H., "Exporting and Import Text With Excel", Nov. 17, 2007, 5 pages.

McRitchie, F. David, "Proper, and other Text changes—Use of SpecialCells", Mar. 27, 2008, 19 pages.

* cited by examiner

Spreadsheet 301

|   | A | B | C |
|---|---|---|---|
| 1 | S | 50 | Current Stock Price |
| 2 | X | 45 | Exercise Price |
| 3 | r | 4.00% | Risk-Free Rate Of Interest |
| 4 | T | 0.75 | Time To Maturity Of Option (In Years) |
| 5 | Sigma | 30% | Stock Volatility, σ |
| 6 |   |   |   |
| 7 | $d_1$ | 0.6509 | <--(LN(S/X)+(r+0.5*Sigma^2)*T)/(Sigma*SQRT(T)) |
| 8 | $d_2$ | 0.3911 | <--$d_1$-Sigma*SQRT(T) |
| 9 |   |   |   |
| 10 | $N(d_1)$ | 0.7424 | <--Uses Formula NormSDist($d_1$) |
| 11 | $N(d_2)$ | 0.6521 | <--Uses Formula NormSDist($d_2$) |
| 12 |   |   |   |
| 13 | Call Price | 8.64 | <--S*N($d_1$)-X*exp(-r*T)*N($d_2$) |
| 14 |   |   |   |
| 15 |   |   |   |

Add Function  311

Name: 312  Call Price

Parameters: 313
- ☐ T    ☒ X
- ☐ r
- ☐ Sigma
- ☒ S

Source Code: 314
```
FunctionCallPrice(S,X)
    T=0.75
    r=4%
    Sigma=30%
    d1=(LN(S/X)+(r+0.5*Sigma^2)*T)/(Sigma*SQRT(T))
    N_d1_=NORMSDIST(d1)
    d2=d1-SQRT(T)*Sigma
    N_d2_=NORMSDIST(d2)
    CallPrice=S*N_d1_-X*EXP(-r*T)*N_d2_
End
```

*Figure 3*

CREATING TEXT FUNCTIONS FROM A SPREADSHEET

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

More specifically, spreadsheet programs are used in a wide variety of different environments. In some more specialized environments, spreadsheets are used in technical computing. For example, domain specialists can use spreadsheets to build and run models and benefit from the rapid prototyping that this form offers. However, fundamental limitations of using spreadsheets as a programming language make them difficult to reuse and maintain when changes to a model are entered. For example, a user may have to manually re-enter data in a plurality of different fields to implement changes. As such, spreadsheets often become tangled and unwieldy when used in these environments.

Some techniques use programming language constructs that can be embedded within a spreadsheet. However, these techniques lack any mechanism to extract functions from a spreadsheet.

Other techniques attempt to mitigate these difficulties by replacing entire calculation chains with source code. These other techniques provide a certain level of "code behind" for a spreadsheet. However, these other techniques lack modularity because they replace large blocks of calculations having little, if any, structure.

BRIEF SUMMARY

The present invention extends to methods, systems, and computer program products for creating text functions from a spreadsheet. One or more results cells are selected in a page of a spreadsheet. The results cell storing a value representing the result of executing a plurality of formulas within the spreadsheet. Values in a plurality of other cells related to the one or more results cell are identified. The value in each of the plurality of other cells corresponding to execution of a combination of one or more of the plurality of formulas.

Additional data in further cells related to the values in the plurality of other cells is identified. The additional data describes the values on the plurality of other cells. The identified additional data is used to generate local variables for use in a programming language. The local variables correspond to the values in the plurality of other cells. A semantic tree representing a function is generated based on the plurality of formulas and the generated local variables. The semantic tree is compilable into executable code configured to calculate the value representing the result, generating of the semantic tree.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a portion of a spreadsheet and corresponding user-interface for creating a text function.

DETAILED DESCRIPTION

Figure 1:
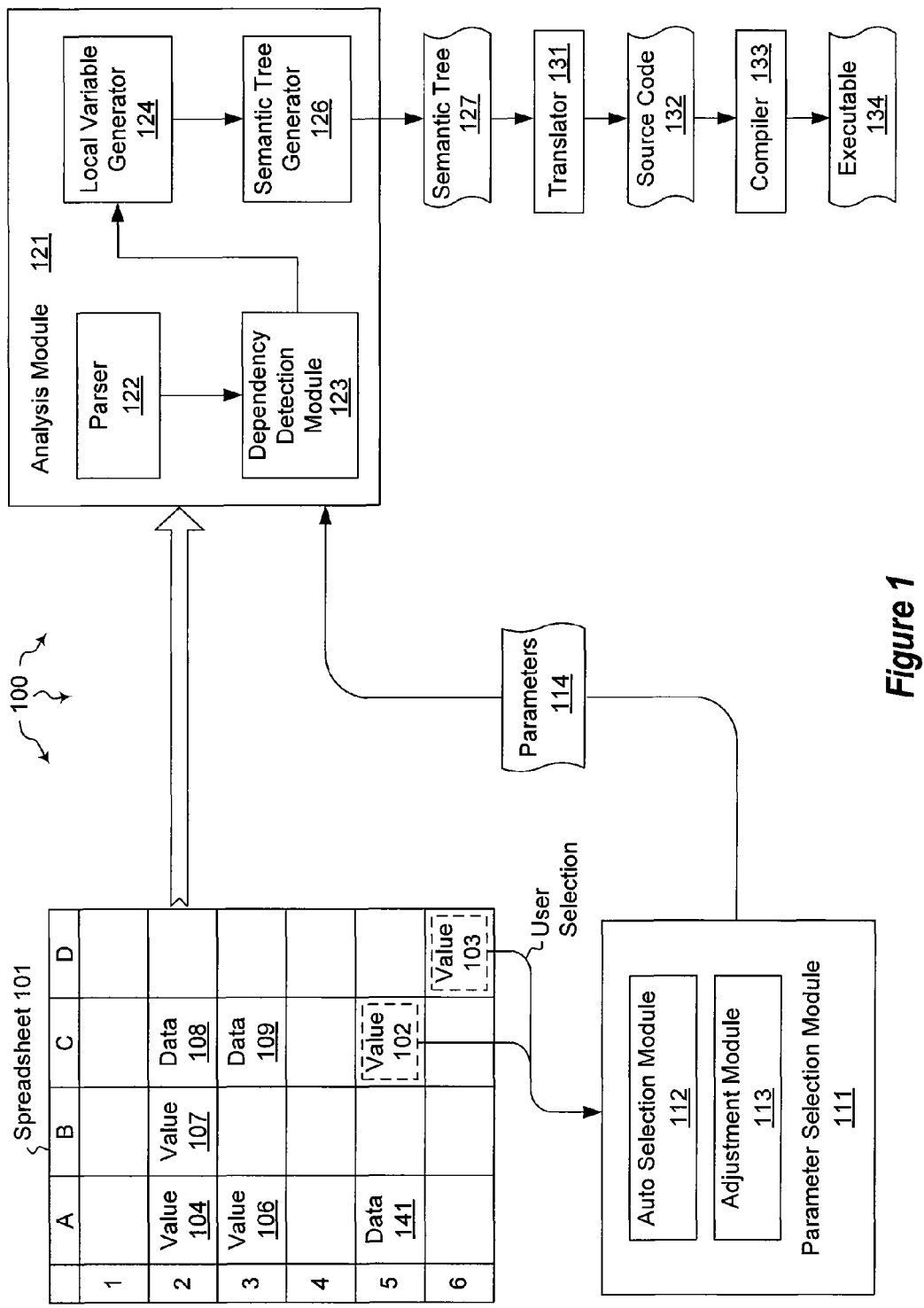
FIG. 1 illustrates an example computer architecture that facilitates creating a text function from a spreadsheet.

The present invention extends to methods, systems, and computer program products for creating text functions from a spreadsheet. One or more results cells are selected in a page of a spreadsheet. The results cell storing a value representing the result of executing a plurality of formulas within the spreadsheet. Values in a plurality of other cells related to the one or more results cell are identified. The value in each of the plurality of other cells corresponding to execution of a combination of one or more of the plurality of formulas.

Additional data in further cells related to the values in the plurality of other cells is identified. The additional data describes the values on the plurality of other cells. The identified additional data is used to generate local variables for use in a programming language. The local variables correspond to the values in the plurality of other cells. A semantic tree representing a function is generated based on the plurality of formulas and the generated local variables. The semantic tree is compilable into executable code configured to calculate the value representing the result, generating of the semantic tree.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention extract functions from spreadsheets and represent the function in textual form. Representation in textual form promotes code reuse, clarity, expressive power, and better performance. Text can be rendered in virtually any programming language, such as, for example, C#, C++, Visual Basic ("VB"), etc. In some embodiments, programming language extensibility to support spreadsheet compatible data types and functions is utilized.

FIG. 1 illustrates an example computer architecture 100 that facilitates creating text functions from a spreadsheet. Referring to FIG. 1, computer architecture 100 includes spreadsheet 101, parameter selection module 111, analysis module 121, translator 131, and compiler 133. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Spreadsheet 101 includes a plurality of cells arrange in a grid. Cells are referred to by column id, row id. For example, cell A2 refers to the cell containing value 104. On the other hand, cell D3 is empty. Spreadsheet 101 can be running within a spreadsheet application, such as, for example, Microsoft® Excel®.

Generally, parameter selection module 111 is configured to receive one or more values from a spreadsheet and derive parameters for use in text based formulas corresponding to the spreadsheet. Auto selection module 112 is configured to automatically select values from spreadsheet 101 for use in deriving parameters. Automatically selected values can be used alternately to or in combination with user selected values for deriving parameters. Adjustment module 113 is configured to adjust values after selection. For example, adjustment module 113 can be used to unselect parameters or select different cells to use as input.

Generally, analysis module 121 is configured to analyze a spreadsheet and corresponding parameters and generate a semantic tree representing a text function. Parser 122 can parse formulas within a spreadsheet starting from a results value in results cell and working backwards through one or more formulas used to calculate the results value. Dependency detection module 123 can identify dependencies between values in the one or more formulas.

Local variable generator 124 can generate variables for inclusion in a text function. Variable names can be inferred from names that are expressly defined in a spreadsheet or guessed from cells that are adjacent to a given cell (e.g., comments in one cell describing data in another cell). Semantic tree generator 126 can generate a semantic tree 127 representing formulas in a spreadsheet.

Translator 131 is configured to translate a semantic tree into source code (text). Compiler 133 is configured to compile source code into executable code.

Figure 2:
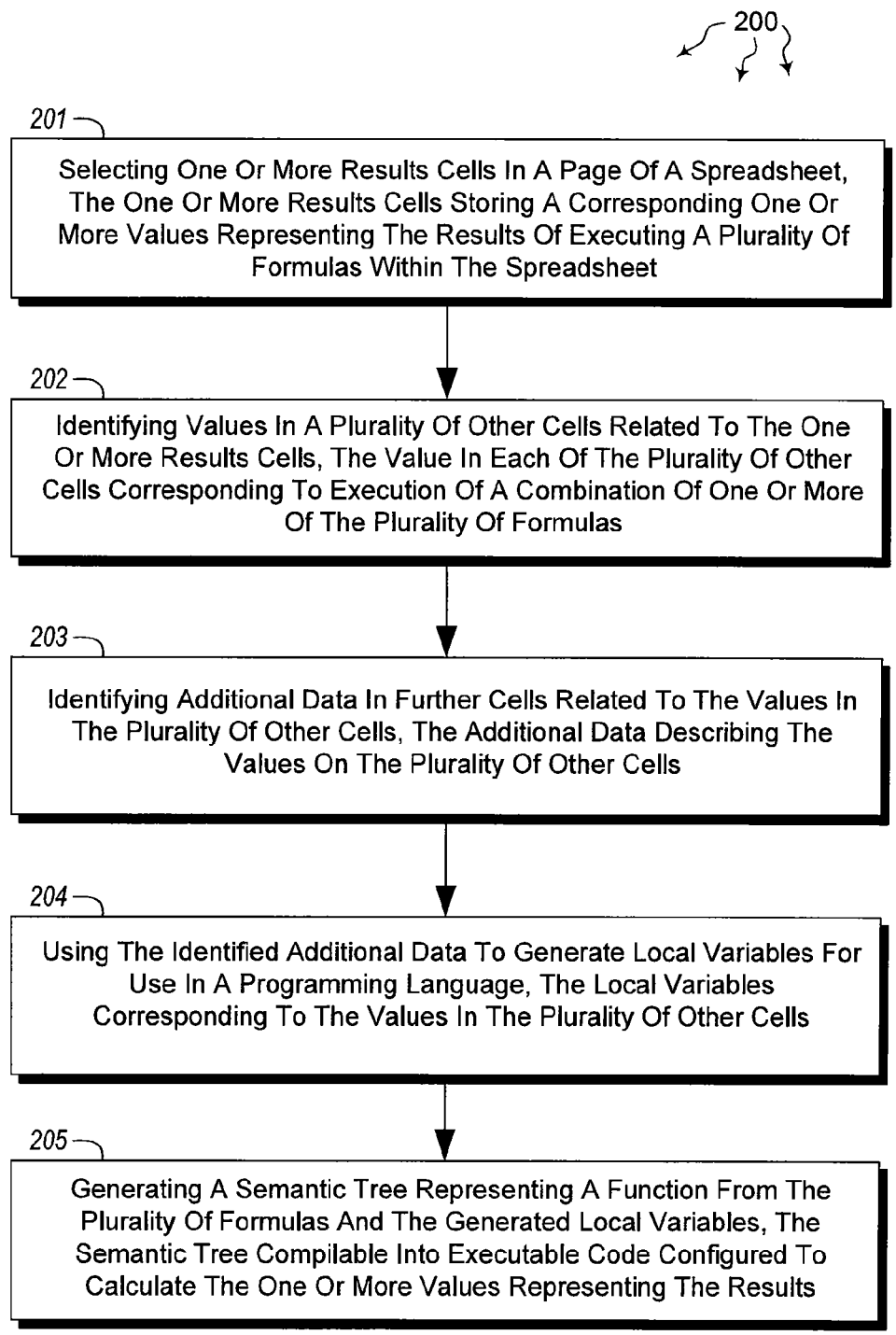
FIG. 2 illustrates a flow chart of an example method for creating a text function from a spreadsheet.

FIG. 2 illustrates a flow chart of an example method 200 for creating text functions from a spreadsheet. Method 200 will be described with respect to the components and data of computer architecture 100.

Method 200 includes an act of selecting one or more results cells in a page of a spreadsheet, the one or more results cells storing a corresponding one or more values representing the results of executing a plurality of formulas within the spreadsheet (act 201). For example, auto selection module 112 can select values 102 and 103 from cells C5 and D6 of spreadsheet 101. Values 102 and 103 can represent the results of executing one or more formulas within spreadsheet 101. In some embodiments, a contiguous range of cells is selected. Parameter selection module 111 can use values 102 and 103 (with possible further using modification entered through adjustment module 113) to generate parameters 114.

Method 200 includes an act of identifying values in a plurality of other cells related to the one or more results cells, the value in each of the plurality of other cells corresponding to execution of a combination of one or more of the plurality of formulas (act 202). For example, parser 122 can identify values 104, 106, 107, and 141 in cells A2, A3, B2, and A5 respectively. Analysis module 121 can determine that values 104, 106, 107, 141 are related to values 102 and 103. For example, values 104, 106, 107, and 141 can be intermediate values used in formulas that calculate values 102 and 103. Dependency detection module 123 can determine when values in intermediate formulas depend from values 102 and/or 103.

Method 200 includes an act of identifying additional data in further cells related to the values in the plurality of other cells, the additional data describing the values on the plurality of other cells (act 203). For example, local variable generator 124 can identify data 108, 109, and 141 as related to (and possibly describing) values 104, 106, and 107 in cells A2, A3, and B2. For example, data 108, 109, and 141 can include comments describing variables and/or indicating what formulas are used in a for generating values 104, 106, and 107.

Method 200 includes an act of using the identified additional data to generate local variables for use in a programming language, the local variables corresponding to the values in the plurality of other cells (act 204). For example, local variable generator 124 can generate local variables for use in a programming language. The local variables can be correspond to values in values 104, 106, and 107 in cells A2, A3, and B2

Method 200 includes an act of generating a semantic tree representing a function from the plurality of formulas and the generated local variables, the semantic tree compilable into executable code configured to calculate the one or more values representing the results (act 205). For example, semantic tree generator 126 can generate a semantic tree 127 representing a function. Semantic tree 127 can be generated from formulas in spreadsheet 101 and local variables generated by local variable generator 124. Semantic tree 127 is compilable into executable code that can calculate values 102 and 103.

Translator 131 can translate semantic tree 127 into source code 132 of one or more programming languages. Compiler 133 can compile source code 132 into executable 134.

FIG. 3 illustrates a portion of a spreadsheet 301 and corresponding user-interface 311 for creating a text function. Name 312, "CallPrice" represents the name of the resulting function. Parameters 313 can be identified from within spreadsheet 301 by a parameter selection module (e.g., similar to 111). Source code 314 represents one or more formulas from spreadsheet 301. As user can check and/or uncheck parameters in parameters 313 to indicate what parameters are passed into the function "CallPrice" and what parameters are automatically populated from values in spreadsheet 301.

Accordingly, embodiments of the invention permit a user to create a new function by selecting the result cell of the spreadsheet. An analysis process can be run on the spreadsheet, starting from the result cell, and collects all cell dependencies. A list of parameters is supplied automatically from the leaf nodes in the calculation. A user can optionally unselect these parameters or pick a different cell (that is part of the calculation) to use as an input. The selected section of the calculation becomes a function.

As such, a subset of a spreadsheet can be captured and run on a different execution engine. A resulting function can interoperate with the spreadsheet via a UDF extensibility model (such as Excel's XLLs) to permit the function to be called as many times as desired on the sheet. The function can also be compiled into a library that is used outside the spreadsheet by other programming languages.

The function can capture the calculation semantics of the subset of the spreadsheet that was selected. More particularly, the function reuses spreadsheet libraries and operators, as well as the order of operations. Reuse allows users to be confident that the selected function behaves similarly to the portion of the spreadsheet it was extracted from.

Heuristics can be used to make the source code more readable. Variable names can be inferred either from names that are expressly defined on the spreadsheet, or guessed from cells that are adjacent to the given cell. Further, code comments can be lifted from the spreadsheet. Positions respect calculation order and can use hints available in the spreadsheet to achieve similar ordering.

When the spreadsheet changes, the resulting code can be updated automatically by rerunning the analysis. The analysis can also output the mappings between cells and the locations in the text. Mappings can be used by other tools, for example to highlight regions in the sheet with regions of the code, and vice versa.

Source code for a function can also be generated in multiple languages. In some embodiments, a "precise" mode is used to capture semantics with increased accuracy. Precise mode can include spreadsheet-compatible functions and data types in the code. In other embodiments, an "approximate" mode is used. Approximate mode uses functions and data types in the target language whenever possible. Approximate mode results in less change of full compatibility. However, code generated in approximate mode looks more natural in the target language, and can generally be more performant.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a computer-implemented method for converting a portion of a spreadsheet into a compilable function, the method comprising acts of:
   executing at a computer system a spreadsheet application that instantiates one or more spreadsheets for processing by the computer system;
   selecting from at least a first cell in a page of a spreadsheet a result value representing the results of executing a plurality of formulas identified within one or more cells of the spreadsheet;

deriving from the selected result value one or more corresponding parameters for the result value;

using the derived parameters for the result value to parse the plurality of formulas from which the result value is obtained in order to identify other cells of the spreadsheet that contain intermediate values related to the result value, the identified intermediate values corresponding to execution of one or a subset of the plurality of formulas;

processing the identified intermediate values in order to identify data in further cells related to the intermediate values, where the identified data represents comments describing the identified intermediate values and/or indications of said one or subset of the plurality of formulas used in generating the identified intermediate values, and then using the identified data to generate local variables for use in a programming language, the local variables corresponding to the intermediate values contained in said identified other cells of the spreadsheet; and using the local variables and said one or subset of the plurality of formulas to generate a semantic tree representing a new callable function that corresponds to a subset of the spreadsheet represented by those cells containing the selected result data, the identified intermediate values and identified data, the new callable function of the semantic tree being compilable into executable code configured to calculate the selected result value when the new function is called and executed.

2. The method as recited in claim 1, further comprising selecting from a second cell a second result value with a value that is independent of the value of the first result value.

3. The method as recited in claim 1, wherein a continuous range of cells containing separate result values is selected.

4. The method as recited in claim 1, wherein using the identified data to generate local variables for use in a programming language comprises using said comments to select variable names for the local variables.

5. The method as recited in claim 1, further comprising an act of translating the semantic tree into source code in one or more different programming languages.

6. The method as recited in claim 5, further comprising an act of compiling the source code from one of the different programming languages into an executable program.

7. A computer program product for implementing at a computing system a method for converting a portion of a spreadsheet into a compilable function, the computer program product comprising one or more physical storage media having stored thereon computer-executable instructions that, when executed at a processor, cause the computer system to perform the method, which comprises acts of:

executing at a computer system a spreadsheet application that instantiates one or more spreadsheets for processing by the computer system;

selecting from at least a first cell in a page of a spreadsheet a result value representing the results of executing a plurality of formulas identified within one or more cells of the spreadsheet;

deriving from the selected result value one or more corresponding parameters for the result value;

using the derived parameters for the result value to parse the plurality of formulas from which the result value is obtained in order to identify other cells of the spreadsheet that contain intermediate values related to the result value, the identified intermediate values corresponding to execution of one or a subset of the plurality of formulas;

processing the identified intermediate values in order to identify data in further cells related to the intermediate values, where the identified data represents comments describing the identified intermediate values and/or indications of said one or subset of the plurality of formulas used in generating the identified intermediate values, and then using the identified data to generate local variables for use in a programming language, the local variables corresponding to the intermediate values contained in said identified other cells of the spreadsheet; and using the local variables and said one or subset of the plurality of formulas to generate a semantic tree representing a new callable function that corresponds to a subset of the spreadsheet represented by those cells containing the selected result data, the identified intermediate values and identified data, the new callable function of the semantic tree being compilable into executable code configured to calculate the selected result value when the new function is called and executed.

8. The computer program product as recited in claim 7, wherein the implemented method further comprises selecting from a second cell a second result value with a value that is independent of the value of the first result value.

9. The computer program product as recited in claim 7, wherein the method is implemented with computer-executable instructions that cause a continuous range of cells containing separate result values is selected.

10. The computer program product as recited in claim 7, wherein using the identified data to generate local variables for use in a programming language comprises using said comments to select variable names for the local variables.

11. The computer program product as recited in claim 7, further comprising computer-executable instructions that, when executed, cause the computer system to translate the semantic tree into source code in one or more different programming languages.

12. The computer program product as recited in claim 11, further computer-executable instructions that, when executed, cause the computer system to compile the source code from one of the different programming languages into an executable program.

13. A computer system, the computer system comprising:
one or more processors a spreadsheet application that instantiates one or more spreadsheets for processing;
system memory; and
one or more computer storage media having stored thereon computer-executable instructions representing a parameter selection module, an analysis module, a translator, and a compiler, wherein the parameter selection module is configured to:
selecting from at least a first cell in a page of a spreadsheet a result value representing the results of executing a plurality of formulas identified within one or more cells of the spreadsheet;
derive from the selected result value one or more corresponding parameters for the result value; and
use the derived parameters for the result value to parse the plurality of formulas from which the result value is obtained in order to identify other cells of the spreadsheet that contain intermediate values related to the result value, the identified intermediate values corresponding to execution of one or a subset of the plurality of formulas;
wherein the analysis module is configured to:
process the identified intermediate values in order to identify data in further cells related to the intermediate values, where the identified data represents comments describing the identified intermediate values and/or indications of said one or subset of the plurality of formulas used in generating the identified intermediate values, and then using the identified data to generate local variables for use in a programming language, the local variables corresponding to the intermediate values contained in said identified other cells of the spreadsheet; and use the local variables and said one or subset of the plurality of formulas to generate a semantic tree representing a new callable function that corresponds to a subset of the spreadsheet represented by those cells containing the selected result data, the identified intermediate values and identified data, the new callable function of the semantic tree being compilable into executable code configured to calculate the selected result value when the new function is called and executed;

wherein the translator is configured to translate the semantic tree into source code in one or more different programming languages; and wherein the compiler is configured to compile the source code from one of the different programming languages into an executable program.

14. The computer system as recited in claim 13, wherein the translator is configured to translate the semantic tree into source code in one or more of C#, C++, and Visual Basic.

15. The method as recited in claim 13, wherein the parameter selection module is further configured to select from a second cell a second result value with a value that is independent of the value of the first result value.

16. The method as recited in claim 13, wherein the parameter selection module is further configured to select a continuous range of cells containing separate result values.

17. The method as recited in claim 13, wherein the analysis module is further configured to use said comments to select variable names for the local variables.

* * * * *